US006951023B2

United States Patent
Bouat et al.

(10) Patent No.: US 6,951,023 B2
(45) Date of Patent: Sep. 27, 2005

(54) MESSAGE-BASED SOFTWARE SYSTEM

(75) Inventors: Sebastien Bouat, Crolles (FR); Thierry Quervel, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 740 days.

(21) Appl. No.: 10/032,883

(22) Filed: Oct. 29, 2001

(65) Prior Publication Data

US 2002/0133640 A1 Sep. 19, 2002

(30) Foreign Application Priority Data

Oct. 31, 2000 (EP) .............................. 00410131

(51) Int. Cl.⁷ ................................................ G06F 9/00
(52) U.S. Cl. ....................... 719/328; 719/313; 719/331; 709/230
(58) Field of Search ................. 719/310, 313–315, 719/328; 709/230

(56) References Cited

U.S. PATENT DOCUMENTS

| | | | |
|---|---|---|---|
| 5,271,003 A | 12/1993 | Lee et al. ................ | 370/58.2 |
| 6,404,746 B1 * | 6/2002 | Cave et al. ............... | 370/262 |
| 6,553,427 B1 * | 4/2003 | Chang et al. ............. | 719/314 |
| 6,674,734 B1 * | 1/2004 | Hsu et al. ................ | 370/331 |
| 6,782,004 B1 * | 8/2004 | Brusilovsky et al. ..... | 370/467 |
| 6,801,526 B1 * | 10/2004 | Stahl et al. ............... | 370/352 |
| 2003/0095541 A1 * | 5/2003 | Chang et al. ............. | 370/352 |
| 2003/0095542 A1 * | 5/2003 | Chang et al. ............. | 370/352 |

FOREIGN PATENT DOCUMENTS

| | | | |
|---|---|---|---|
| WO | 97/22928 | 6/1997 | ........... G06F/9/46 |
| WO | 00/48368 | 8/2000 | ........... H04L/12/66 |

OTHER PUBLICATIONS

Tomasic, A., et al., "Scaling Heterogeneous Databases and the Design of Disco," *Proceedings of the 16th International Conference on Distributed Computing Systems*, pp. 449–457 (May 27, 1996).

Williams, P., "IBM MQSeries Commercial Messaging," *Sigice Bulletin*, Association for Computing Machinering, vol. 20, No. 4, (Apr. 1, 1995).

Lakshmi–Ratan, R.A., "The Lucent Technologies Softswitch—Realizing the Promise of Convergence," *Bell Labs Technical Journal*, vol. 4, No. 2, pp. 174–195 (Apr. 1999).

* cited by examiner

*Primary Examiner*—St. John Courtenay, III

(57) ABSTRACT

The present invention relates to logic systems which use a message-based API, and in particular to telecommunication systems. The present invention aims to overcome drawbacks in the way in which data is sent between, for example, a gatekeeper unit and a service application running on a service platform. By providing a formatter or formatter units on the gatekeeper units, incoming messages may be pre-processed thereby reducing the bandwidth requirements for data transfer. Each formatter unit may be specific to a service application, and ensures that data arrives at the service platform in the appropriate format.

20 Claims, 2 Drawing Sheets

MESSAGE-BASED SOFTWARE SYSTEM

This invention generally relates to systems which use a message-based API, and in particular to telecommunication systems, for example, such as systems used in Internet Protocol networks when transmitting voice (voice IP).

As illustrated in FIG. 1, a typical gatekeeper and service system consists of a gatekeeper unit 100 and a service platform 200 connected together via a suitable interface 300. The main functions of these two elements are:

the gatekeeper 100—which handles Registration and Admission Service (RAS) messages, which typically consist of requests for obtaining subsequent so-called Q931 intermediate messages for establishing a voice link between a caller and at least one callee. The RAS messages may be received by the gatekeeper unit 100 from terminals on the Internet protocol network and also sent by the gatekeeper unit 100 to the terminals. RAS and Q931 messages are defined by the H323 standard;

the service platform 200—which hosts services such as signalling services, billing services, or call diversion services. Each of these services is handled by a specific service unit 210, 220, 230 of the platform 200.

The gatekeeper unit 100 and service platform 200 communicate together by exchanging messages. These messages are transferred via an interface 300, which is an intermediate unit which typically includes an Application Programming Interface (API), i.e. a set of libraries containing specific tools. Such an API is typically a message-based API, which is a message-based set of libraries. A message-based API uses a communication framework and is made up of a set of messages conveyed over this framework.

In known telecommunication systems, the gatekeeper unit 100 receives messages from Internet protocol end-points (for example IP phones or Personal computers) through a series of connections 105. The received messages each consist of a series of fields arranged according to a specific format. This format is typically defined by, for example, the ASN.1 standard. Incoming ASN.1 messages are generally in an encoded form according to the PER (Pact Encoding Rules) standard. The incoming messages must then be decoded by the gatekeeper unit, which requires powerful decoding resources in the gatekeeper unit.

The gatekeeper unit 100 decodes each incoming message and determines which of the service units 210, 220, 230 is the destination unit that requires the data contained in the received message. Typically the data required by different service units differs from one service unit to another. Furthermore, the data is only accepted by a given service unit 210, 220, 230, if the data is in the specific format of the unit. For example, unit 210 may require a C data structure whereas unit 220 may require a XML data structure.

In the known art, the gatekeeper unit 100 sends the whole received message to the service platform 200, which then carries out filtering and formatting of the message upstream of the service units 210, 220 and 230.

In order to allow the entire ASN.1 messages to be transferred between gatekeeper 100 and service platform 200, it is necessary to re-encode them using the PER standard in the gatekeeper unit 100 upstream of the API 300. For such complex messages, such re-encoding reduces the transfer rate of the API 300. After the transit through the API 300 the PER-encoded message is once again decoded in the service platform 200.

One aim of the present invention is to reduce the heavy workload in the known telecommunication system, and, in particular, to reduce the workload due to decoding/encoding, and to improve performance. This is achieved in a number of ways including minimizing the number of hops, or translation steps, between the stack and the application. Additionally, performance is also increased by minimizing the amount of data exchanged between the stack and the application and hence reducing the associated encoding and decoding overheads. Heterogeneity management is not considered since generally both the stack and the application are provided by a single vendor.

Accordingly, the present invention proposes a system and a method for a system using a message-based set of libraries which substantially reduces the resources required for conveying the messages so as to improve overall performance and efficiency.

A system according to the invention is a system including a software component comprising an input for receiving messages from other systems and an output for sending messages to a telecommunication service application, wherein the output comprises a message-based set of libraries capable of transmitting messages to the application, and further wherein the software component includes a formatter unit for processing received messages prior to transmission to the application via the message-based set of libraries.

A method according to the invention is a method for execution in a gatekeeper and telecommunication system which includes a gatekeeper unit, the method comprising: receiving messages from other systems; sending received messages to a telecommunications service application via a message-based set of libraries; processing the received messages, prior to sending them, to ensure that sent messages are in an appropriate format for the telecommunications service application.

A further method according to the present invention is a method for execution in a gatekeeper and service telecommunication system including a gatekeeper unit which has an input for receiving, from an internet protocol network, requests for establishment of communication links, the telecommunication system further including a service platform comprising at least two service units, each capable of deriving, from a message received from the gatekeeper unit, service information relating to a communication link to which said message is associated, the service units accepting messages in respective different message formats, and the system further including means for transferring messages from the gatekeeper unit to the service platform and from the service platform to the gatekeeper unit, wherein the method further comprises the step of formatting messages into said respective message formats of said at least two service units, this formatting step being carried out by at least two formatter units in the gatekeeper unit.

The present invention is intended to be implemented on a tightly couple stack/application, where communication overhead has low impact on performance. Preferably the stack and the application are executed on the same computer or processor, or, if on separate computers, preferably on the same local area network (LAN).

Further features, goals and advantages of the invention will appear to those skilled in the art through the following description, made with reference to the appended figures, in which.

Figure 1:
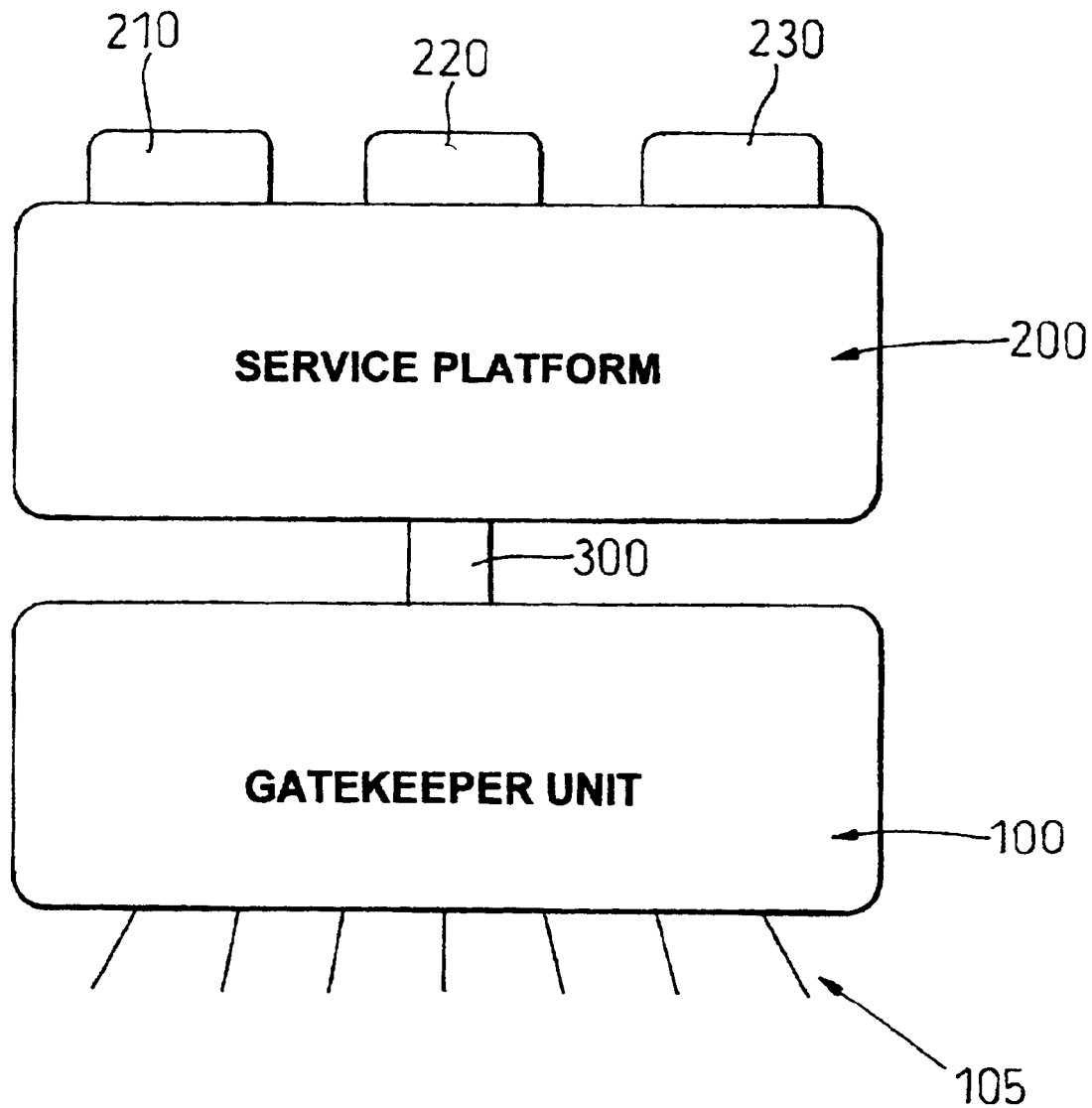
FIG. 1 illustrates a prior art telecommunication system.
Figure 2:
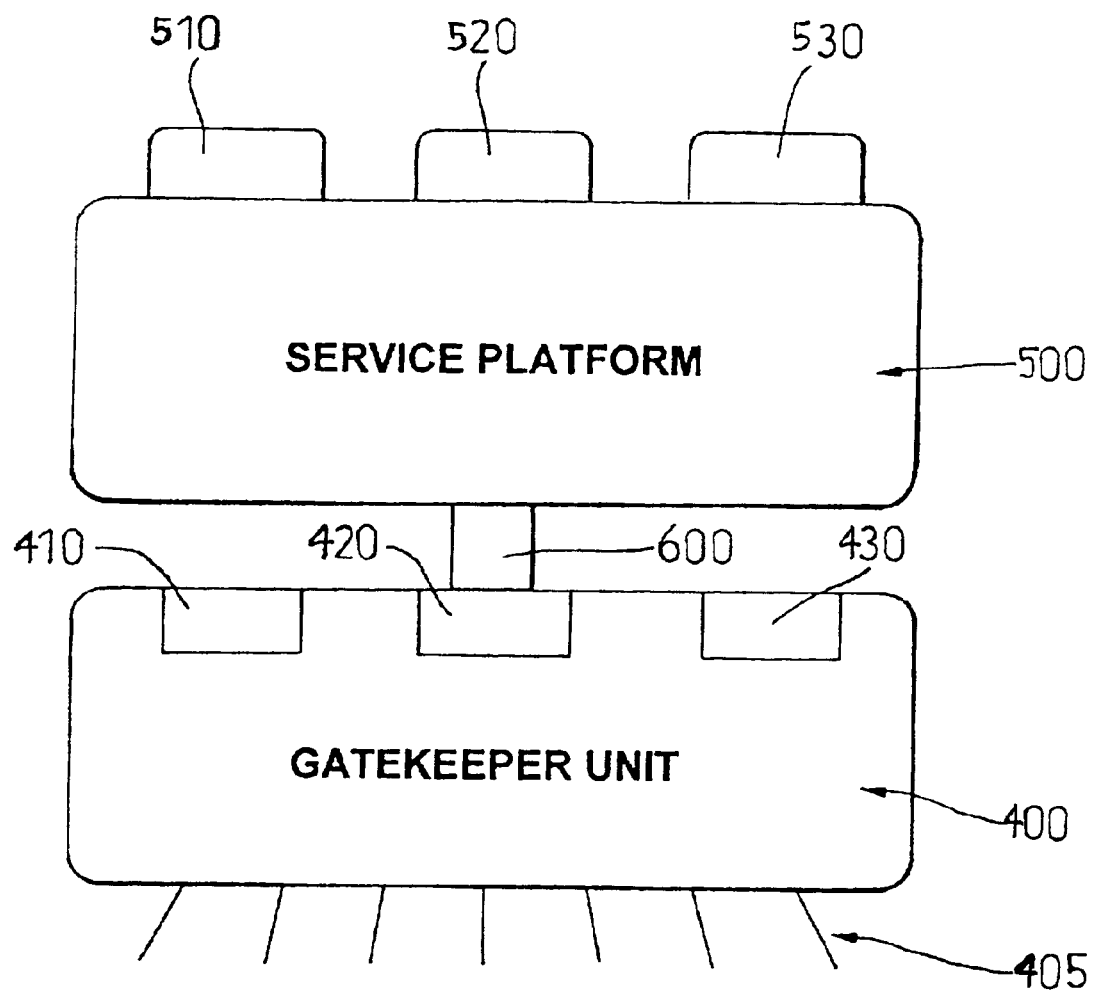
FIG. 2 illustrates a telecommunication system according to one embodiment of the present invention.

The telecommunication system illustrated on FIG. 2 (also called telecommunication stack or protocolar stack) consists, similarly to the known stacks, of a gatekeeper unit 400 and a service platform 500 which includes service units 510, 520 and 530. The service units 510, 520 and 530 can be called "users" of the stack.

The telecommunications system also includes an intermediate transfer unit or interface 600 which has the role of transferring messages between the gatekeeper unit 400 and the service platform 500. In one embodiment the interface is a message-based Application Programming Interface, which is a message-based set of libraries. Such an API uses a communication framework and is made of a set of messages conveyed over this framework.

As for the known stacks, gatekeeper unit 400 receives messages in an encoded form through connections 405 and decodes the received messages into local messages of the gatekeeper unit, in a local language of the gatekeeper unit. The local language may be, for example, the C language.

The gatekeeper unit 400 of FIG. 2 further includes a series of formatter units 410, 420, 430 which are each a adapted to process the local messages before sending them through the intermediate transfer unit 600. Each of the units 410, 420 and 430 transform local messages into messages of a particular format which comply with the specific requirements of a particular service unit among units 510, 520 and 530.

After decoding an incoming message and determining which of the service units 510, 520 or 530 is concerned by the message, the gatekeeper 400 transmits the decoded local message to the concerned unit or to the concerned units among units 410, 420 and 430. Units 410, 420 and 430 format the local messages into the specific formats of service units 510, 520 and 530 respectively.

When the unit 410 receives a local representation of the ASN.1 message, which consists of a series of fields, it performs a selection among the fields of the message, and retrieves only the data which is necessary for the corresponding service unit 510, as will be described in greater detail hereinafter. The unit 410 only reads the values of the selected fields of the message and generates a filtered message containing the selected values, in the appropriate format required by the service unit 510.

Hence, the unit 410 constitutes a filter which produces a simplified or shortened message, which can be transmitted through the interface 600 using less bandwidth and in a simple format (no heavy PER encoding).

In the present embodiment, the interface 600 includes an API. More generally, the interface 600 can easily be built, based on a known API model, for example the so-called "Opencall telecommunication stack". Before transmitting the filtered message through the API 600, the unit 410 converts the retrieved data into the format of the service unit 510, so that the service platform 500 receives a message which is ready to be sent to the service unit 510.

The service units 510, 520 and 530 may include, for example, C++ sets of instructions, Java applets, or programs in languages which are specific to given programming environments such as applications running on top of a so-called Service Execution Platform (SEP) developed by the applicant.

Different types of applications understand different data formats. For example, a C application handles C-structures, a Java applet handles XML structures, a SEP platform may use either ASN.1 standard or another known proprietary format known as "Data Description Language" (DDL).

The gatekeeper unit 400 of the present embodiment can be replaced by any software component exporting a message-based application to some applications, for example any telecommunication software component for authorising a communication link to be established.

By having its own formatter units, the gatekeeper unit 400 makes the service platform 500 and the interface 600 independent from the gatekeeper unit. In other words, the service platform 500 and the interface 600 can be adopted with any such software component having the formatting units 410, 420, 430. The platform 500 does not have to perform any message re-formatting work that would be specific to a given software component 400 because message format is the natural format understood by the concerned service unit.

The software component 400 is also independent from the service units 510, 520, 530 and from the message formats that the service units 510, 520, 530 can understand. The gatekeeper unit does not a-priori know about the service units and is advantageously able to cope with the requirements of any service unit, i.e. to format each message in all the possible formats, each format corresponding to a specific formatter unit. The software component 400 is independent from any limitation of service units regarding data format.

In a preferred embodiment, it is particularly advantageous that the formatter units 410, 420 and 430 are libraries, that the software component 400 links to at run-time.

The formatter units 410, 420, 430 advantageously use an Application and Programming Interface including means for accessing the desired data of the message in the message representation which is local to gatekeeper unit 400.

In the above-described embodiment, the formatter units 410, 420 and 430, perform both a filtering and a conversion of the local messages of gatekeeper unit 400 into languages which are specific to the concerned service units 510, 520, 530, respectively. In alternative embodiments it is also possible that the formatter units realise only translations, or only filtering.

Hereafter are given two examples of formatter units that each perform both filtering and translation. The formatter unit according to Example 1 formats data which are then forwarded to a billing unit. The formatter unit according to Example 2 formats data which are then forwarded to a call diversion unit.

EXAMPLE 1

A billing service is a service which derives billing information associated with a communication link, on the basis of messages transmitted to this service.

A billing service typically deals with connection establishment and hang-up, in order to compute the duration of a call. In a simple model (for example, fixed pricing) a billing service simply needs the identity of the caller to set up customer's bill. For illustrative purposes, consider that the billing service processes admission (ARQ) and disengage (DRQ) messages complying with the H323 standard.

The ASN.1 structure of an ARQ message is the following:

```
AmissionRequest ::= SEQUENCE
{
    requestSeqNum         RequestSeqNum,
    callType              CallType,
    callModel             CallModel OPTIONAL,
    endpointIdentifier    EndpointIdentifier,
    destinationInfo       SEQUENCE OF AliasAddress OPTIONAL,
    destCallSignalAddress TransportAddress                OPTIONAL,
    destExtraCallInfo     SEQUENCE OF AliasAddress OPTIONAL,
    srcInfo               SEQUENCE OF AliasAddress,
    srcCallSignalAddress  TransportAddress OPTIONAL,
    bandWidth             BandWidth,
    callReferenceValue    CallReferenceValue,
    nonStandardData       NonStandardParameter OPTIONAL,
    callServices          QseriesOptions OPTIONAL,
    conferenceID          ConferenceIdentifier,
    activeMC              BOOLEAN,
    answerCall            BOOLEAN,
    ...,
    canMapAlias           BOOLEAN,
    callIdentifier        CallIdentifier,
    srcAlternatives       SEQUENCE OF Endpoint OPTIONAL,
    destAlternatives      SEQUENCE OF Endpoint OPTIONAL,
    gatekeeperIdentifier  GatekeeperIdentifier OPTIONAL,
    tokens                SEQUENCE OF ClearToken OPTIONAL,
    cryptoTokens          SEQUENCE       OF          CryptoH323Token
OPTIONAL,
    integrityCheckValue   ICV OPTIONAL,
    transportQOS          TransportQOS OPTIONAL,
    willSupplyUUIEs       BOOLEAN
}
```

The identity of the caller can be found in the EndpointIdentifier field (128 character string). Therefore the ARQ message that the H323 gatekeeper unit 400 forwards to the billing service unit will hold this single field as a result of a filter function realised by the formatter unit.

A billing service running on an SEP platform of the OpenCall type uses DDL (Data Description Language) for formatting messages. This can be considered as a sub-set of C data structures, so that the representation of the ARQ message will be:

```
struct EndpointIdentifier {
    int size;            // The actual size of the string
    char string[128];    // The content of the string
};
struct AdmissionRequest {
    struct EndpointIdentifier endpointIdentifier;
};
```

The formatter unit which produces such an ARQ message can build messages directly in DDL.

Another type of billing service may be implemented as an applet running in a Java Virtual Machine and using the XML standard for formatting data. The representation of the ARQ message would be in such case:

<xsd:simpleType name="EndpointIdentifier" base="xsd:string">
  <xsd:maxLength value="128"/>
</xsd:simpleType>
<xsd:complexType name="AdmissionRequest">
  <xsd:element name="endpointIdentifier" type="EndpointIdentifier">
</xsd:complexType>

The considered formatter unit can build messages handling XML data through any existing XML engine available as a C library.

As far as DRQ messages are concerned, they are only used as triggers, i.e. the service does not need to know the contents of any field thereof. Therefore, DRQ messages are forwarded by the gatekeeper units 400 as empty messages without representation.

EXAMPLE 2

Another service such as a call diversion service may be running at the same time as the billing service.

A call diversion service is a service which, on the basis of a message transmitted thereto, derives information about an endpoint with which a communication link should be established, the endpoint being different from that initially designated in an original link designation. In other words, such a service looks at the called endpoint and forwards the call to another endpoint if the original one is registered for diversion.

Such a service needs the identity of the called endpoint, which can be found from the destinationInfo field in an incoming ARQ message. Therefore, the structure of a DDL message to be directed to a call diversion service unit is quite different from the structure of a message sent to a billing service unit since it only contains the set of alias addresses of the called endpoint.

It is thus understood that the billing and the call diversion services use two distinct formatters that construct two different messages, each including a specific part of the same incoming ARQ message.

When many service units share the same data format (this applies for instance to OpenCall SEP services that all handle DDL messages), the generation of the formatter units can be automated as will now be described.

A formatter unit generator is provided to the user in the form of a graphical tool, allowing the selection of the fields and sub-fields each service unit needs in each message. The user also sets constraints on ASN.1 "sequence-of" types (arrays of items). Sequence-of may be unbound, or upper bound may be high, and a suitable upper bound limit is definably.

The service creation environment therefore has the means to automatically generate both the data types required for developing the service and the formatter that converts messages from the gatekeeper into those data types and vice-versa (typically DDL).

Many service units may also share the same formatter unit. For instance, a default formatter exporting a reasonable DDL subset of the H323 message-set, could apply to most of the service units running on top of the OpenCall SEP. Other services with specific requirements should use their own formatter.

A formatter unit typically provides an encode/decode interface. It performs the encoding operation before forwarding a message to the service. The formatter unit also processes messages received from the service unit through the decoding operation.

As already described, the formatter unit advantageously makes use of an API to access the local representation (LR) of messages within the gatekeeper unit, i.e. to read some fields of a message which is in a representation used in the gatekeeper. This API, hereafter referred to as a local representation API, performs 2 main operations:

Get-field: retrieve the value of a field knowing its logical name (typically its path in the ASN.1 structure); and Set-field: sets the value of a field by knowing its logical name.

The formatter unit can both format messages directed to the service, and parse messages received from the service. Formatting extracts and presents data from the local representation of a request message so that it can be processed by the service. Parsing extracts data from a reply message and sets this in the local representation of this reply.

In addition the Local Representation API should provide operators for determining information about optional fields, length of arrays, the selected alternative in choices, etc.

It should be understood that, although the herein described embodiments relate to a gatekeeper system, the invention applies to any software component which exchanges messages with telecommunication service applications and which exports a message based API to some a-priori unknown applications.

It should also be understood that the different elements described above (service units 510, 520, 530, service platform 500, interface 600, gatekeeper unit 400, formatter units 410, 420, 430) can be physically implemented on one or more hardware platforms, it being understood that the hardware implementation of the system may be de-correlated from the logical implementation.

What is claimed is:

1. A system including a software component comprising an input for receiving messages from other systems and an output for sending messages to a telecommunication service application, wherein the output comprises a message-based set of libraries capable of transmitting messages to the application, and further wherein the software component includes a formatter unit for processing received messages prior to transmission to the application via the message-based set of libraries to ensure that sent messages are in an appropriate format for the telecommunications service application.

2. A system according to claim 1, wherein the formatter unit processes the received messages by filtering to thereby provide processed messages to the application in an appropriate format which includes only part of the data of the received message.

3. A system according to claim 1, wherein the formatter unit processes the received messages by converting the received messages to thereby provide processed messages to the application in an appropriate format.

4. The system of claim 3, wherein the formatter units convert dispatched messages into respective different languages.

5. A system according to claim 1, further comprising a plurality of telecommunications service applications and a plurality of formatter units, each formatter unit being adapted to provide processed messages in respective different formats.

6. A system according to claim 1, wherein the message-based set of libraries is a message-based Application Programming Interface.

7. The system of claim 1, wherein the input is adapted for receiving messages from the Internet protocol network and wherein the system further comprises a second output for sending messages into such a network.

8. The system of claim 7, wherein the software component forms a gatekeeper component which has means to receive requests for the establishment of communication links from an internet protocol network, and means for sending into the network responses to such requests via the second output.

9. The system of claim 8, wherein the gatekeeper component further includes means for decoding messages incoming from the internet protocol network into a local representation of the gatekeeper component.

10. The system of claim 1, wherein the software component further includes means for dispatching messages onto the formatter units.

11. The system of claim 10, wherein the dispatched messages are in the form of a series of fields and further wherein the formatter units include means to retrieve values of some fields of a dispatched message to produce a message including said retrieved values.

12. The system of claim 11, wherein the formatter units further include means for receiving messages in response to the sent formatted messages, and further wherein the software component includes means for handling messages which consist of a series of fields, and in that at least one of the formatter units includes means for setting a value of a field of a message handled by the software component in accordance with at least one parameter of a received response-message.

13. The system of claim 1, wherein that the message-based set of libraries is an Application Programming Interface capable of transferring messages which are in different formats.

14. The system of claim 1, wherein the message-based set of libraries is adapted for transmitting differently formatted messages.

15. The system of claim 1, wherein the software component, the telecommunications service application and the output are implemented on a tightly coupled stack running of the same hardware platform.

16. A method for execution in a gatekeeper and telecommunication system which includes a gatekeeper unit, the method comprising:

receiving messages from other systems;

sending received messages to a telecommunications service application via a message-based set of libraries;

processing the received messages, prior to sending them, to ensure that sent messages are in an appropriate format for the telecommunications service application.

17. A method for execution in a gatekeeper and service telecommunication system including a gatekeeper unit which has an input for receiving, from an internet protocol network, requests for establishment of communication links, and which gatekeeper unit further has means to send responses to such requests into such a network the telecommunication system further including a service platform comprising at least two service units, each capable of deriving, from a message received from the gatekeeper unit, service information relating to a communication link to which said message is associated, the service units accepting messages in respective different message formats, and the system further including means for transferring messages from the gatekeeper unit to the service platform and from the service platform to the gatekeeper unit, wherein the method further comprises the step of formatting messages into said respective message formats of said at least two service units, this formatting step being carried out by at least two formatter units in the gatekeeper unit.

18. A system including a software component comprising an input for receiving messages from other systems, and an output for sending messages to a plurality of telecommunication service applications, wherein the output comprises a message-based set of libraries capable of transmitting messages issued from said output means of the software component to the application, and further wherein the software component includes a plurality of formatter units for processing the received messages, prior to transmission to the application via the message-based set of libraries, to provide processed messages to the application, the processed messages including only part of the data of the received message, and each formatter unit adapted to provide processed messages in respective different formats.

19. A gatekeeper and service telecommunication system including a software component comprising an input for receiving messages from other systems, and an output for sending messages to a plurality of telecommunication service applications, wherein the output comprises a message-based set of libraries capable of transmitting messages issued from said output means of the software component to the application, and further wherein the software component includes a plurality of formatter units for processing the received messages, prior to transmission to the application via the message-based set of libraries, to provide processed messages to the application, the processed messages including only part of the data of the received message, and each formatter unit adapted to provide processed messages in respective different formats.

20. A system including a software component comprising input means for receiving from other systems, and output means for sending messages to a series of telecommunication service applications, wherein the system further includes a message-based set of libraries capable of transmitting messages issued from said output means of the software component to said series of applications, the message-based set of libraries being activated by said software component, in that the software component includes at least two formatter units for formatting messages into at least two different respective message formats for transmission to said applications via said message-based set of libraries.

* * * * *